Patented Nov. 10, 1936

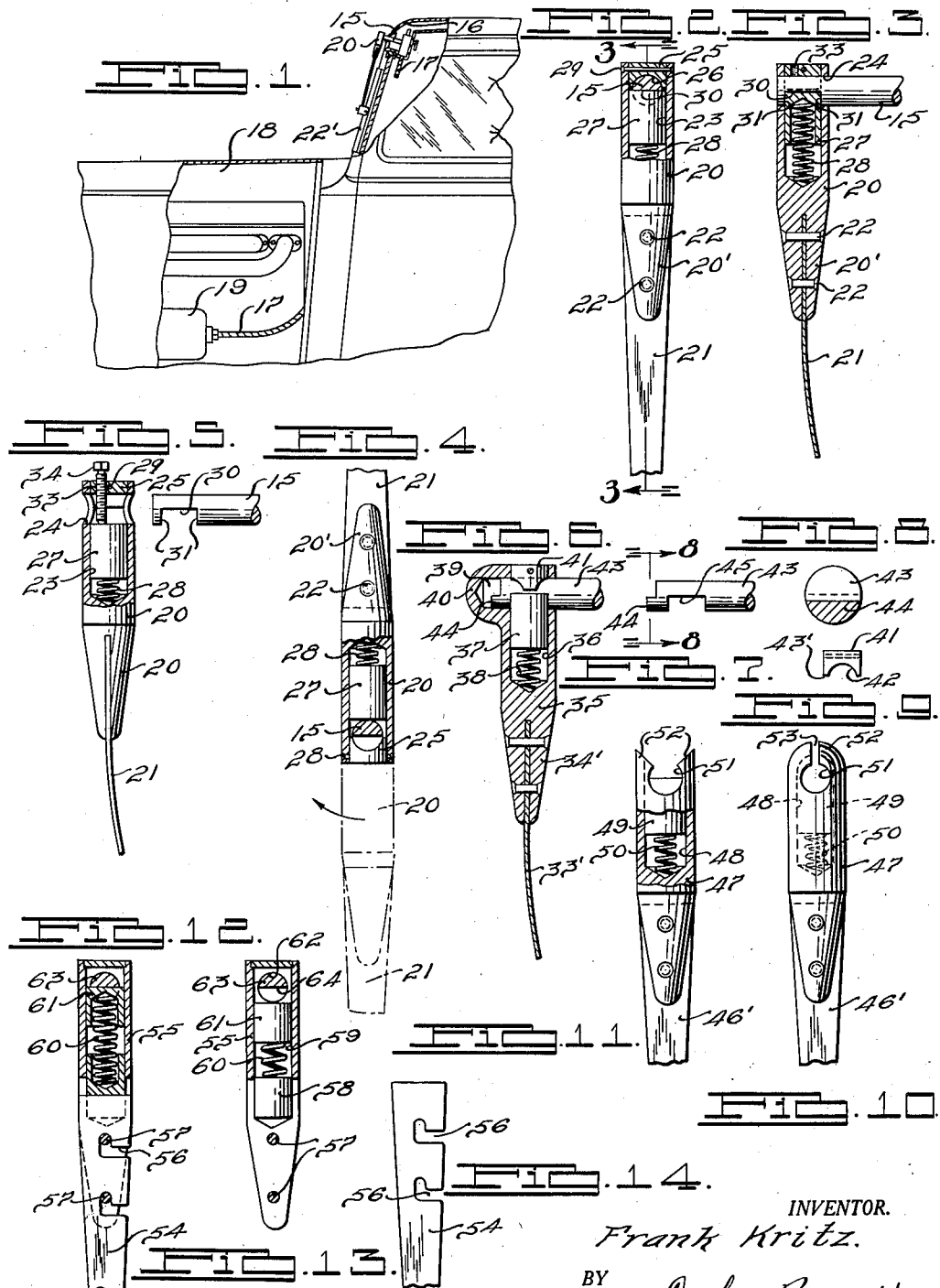
Nov. 10, 1936. F. KRITZ 2,060,325
WINDSHIELD WIPER ARM AND DRIVE SHAFT ASSEMBLY
Filed Jan. 14, 1935
INVENTOR.
Frank Kritz.
BY
Harness, Dickey, Pierce & Hans
ATTORNEYS.

2,060,325

UNITED STATES PATENT OFFICE 2,060,325

WINDSHIELD WIPER ARM AND DRIVE SHAFT ASSEMBLY

Frank Kritz, Detroit, Mich.

Application January 14, 1935, Serial No. 1,593

11 Claims. (Cl. 64—29)

This invention relates to improvements in windshield wiping apparatus.

More particularly the invention pertains to an improved windshield wiper arm and driving shaft assembly.

Heretofore it has been the practice to provide between the wiper arm and the drive shaft of windshield wiping apparatus, a detachable connection of a character which established a non-releasable driving connection therebetween while the parts are in assembled relation. The continuous oscillation of a wiper arm, connected in this manner with its drive shaft, interferes materially with cleaning of the windshield by the use of a cloth or chamois. More serious, however, are the consequences which result when a mechanically operated windshield wiper element which is non-releasably drivingly connected with the drive shaft, is accidentally held against oscillatory movement while the actuating mechanism is in operation, or in which the arm is manually forced to oscillate when the mechanism is not in operation. In this event some part of the chain of mechanism by which the wiper is actuated fails and the apparatus is rendered completely inoperative, usually at a time when it is needed, thereby involving considerable expense for repair and greatly inconveniencing the operator of the vehicle if not actually jeopardizing the safety of the car and its occupants.

One of the main objects of the invention is to provide a releasable driving connection between the wiper arm and the drive shaft which will permit the wiper blade to be held against oscillation while the apparatus is in operation without injuring any of the parts thereof.

Another object of the invention is to provide a releasable driving connection of this character which also serves to detachably couple the wiper arm to the drive shaft.

Further objects of the invention are to provide a resiliently urged detent in a windshield wiper arm which cooperates with the shaft on which it is mounted in such a manner as to detachably hold the arm on the shaft and establish a yielding driving connection therebetween which permits independent oscillation of the shaft relative to the arm when the latter is held against movement by a force of a predetermined magnitude; to provide means for temporarily holding the detent in a retracted position during attachment of the arm to its shaft; and to provide a shaft and windshield wiper arm which are so constructed as to be conveniently separable by movement of the arm axially of the shaft when the arm is disposed in a predetermined angular relation.

An additional object of the invention is to provide a shaft for a windshield wiper arm of the foregoing character which is equipped with an axially protruding element that is adapted to urge the detent to an unobstructing position so as to accommodate insertion of the shaft into the passage in the arm in which it is normally received.

A still further object of the invention is to provide a windshield wiper arm of this character in which provision is made for permitting access to be had to the detent for the purpose of retracting the same with the aid of a simple tool such as a screw driver or other suitable means.

Other objects of the invention are to provide a wiper arm of this character having a separable stem and socket portions; to provide a detent in the socket portion of the wiper arm for establishing a releasable driving connection between the arm and its shaft; and to provide a single resilient element for yieldably urging the detent towards its operative position and which also serves to releasably retain the socket and stem portions of the wiper arm in their assembled relation.

The above being among the objects of the invention, the same consists of certain novel features of construction and combination of parts to be hereinafter described with reference to the accompanying drawing and then claimed, having the above and other objects in view.

Illustrative embodiments of the invention are shown in the accompanying drawing, in which:

Fig. 1 is a fragmentary, side elevational view, partially in section, of a vehicle equipped with windshield wiping apparatus embodying the invention.

Fig. 2 is a fragmentary face view, partially in section, of a windshield wiper arm and drive shaft assembly which embodies the invention.

Fig. 3 is a vertical sectional view taken on the line 3—3 of Fig. 2, showing the wiper arm in assembled relation on its driving shaft.

Fig. 4 is a sectional view, similar to Fig. 2, showing the wiper arm in an inverted position and illustrating the manner in which it may be removed from its driving shaft.

Fig. 5 is an exploded view of the wiper arm and shaft illustrating one way in which the arm may be conditioned for mounting it upon the driving shaft.

Fig. 6 is a vertical longitudinal sectional view of a wiper arm and drive shaft assembly embodying a modified form of the invention.

Fig. 7 is a fragmentary, side elevational view of a driving shaft suitable for use in connection with the wiper arm illustrated in Figure 6.

Fig. 8 is a vertical sectional view taken on the line 8—8 of Fig. 7.

Fig. 9 is a detailed side elevational view of a plug for the outer extremity of the wiper arm shown in Fig. 6.

Fig. 10 is a face view of a wiper arm embodying a still further development of the invention.

Fig. 11 is a view similar to Fig. 10 showing the wiper arm illustrated therein, partially in section, and in an incomplete state of its manufacture.

Fig. 12 is a fragmentary, face view partially in section of a wiper arm and shaft assembly embodying a still further development of the invention.

Fig. 13 is a longitudinal, vertical sectional view of one of the parts of the wiper arm shown in Fig. 12.

Fig. 14 is a fragmentary, face view of the other part of the wiper arm shown in Fig. 12.

In Fig. 1 of the drawing is illustrated the manner in which the improved windshield wiping apparatus is installed in a vehicle. The actuatng apparatus includes a driving shaft 15 which extends through and is journaled in an aperture formed in the header 16 of the vehicle body. In the installation illustrated, the shaft 15 is provided with suitable gearings or other suitable means which is operatively connected with a flexible shaft 17 extending from the vicinity of the header 16 to the interior of the engine compartment 18 of the vehicle, where it is operatively connected to any engine or otherwise driven part of the mechanism. The lower end of the flexible cable 17 is operatively connected with the shaft of the generator 19 which is in turn driven in timed relation with the engine. It should be understood that windshield wiping apparatus embodying the invention can be used to material advantage in conjunction with any type of driving means including electrically and pneumatically energized driving mechanism, although it is particularly desirable when, as in the illustration shown, a positive driving connection is provided between the engine and the shaft by which the wiper arm is oscillated.

In the form shown in Figs. 2 to 5, inclusive, the wiper arm includes a tubular end portion 20 having a bifurcated section 20' between the prongs of which a stem 21 is rigidly secured by rivets 22. The end portion 20 preferably comprises a die casting and the stem is preferably sufficiently resilient to maintain wiping contact between a wiping element 22' on the lower end of the stem 21, and the windshield with which the apparatus is associated. The tubular die cast end portion 20 is provided with a cylindrical axially extending bore 23 and a transversely extending passage 24. The passage 24 is located slightly below the upper extremity of the tubular end portion 20 which is closed by a plug 25 having a substantially semi-cylindrical recess 26 in its inner extremity registering with the passage 24. Slidably mounted in the bore 23 of the tubular end portion 20 is a plunger 27 which is normally yieldably urged outwardly by a spring 28 bearing between the plunger and the inner extremity of the bore 23. The plug 25 is preferably rigidly secured to the upper extremity of the tubular end portion 20 by a pin or rivet 29 or by other suitable means, such for example as spot welding.

Formed in the external end portion of the shaft 15 is a notch 30 of sufficient size to receive the outer end portion of the plunger 27. This notch is bounded by spaced shoulders 31 extending substantially radially of the shaft 15 and it is provided with a substantially flat inner face which abuts the outer face of the plunger.

The wiper arm may be conveniently mounted on its shaft 15 in the manner illustrated in Fig. 5, by providing a threaded opening 33 in the cap 25 in which a cap screw 34 is disposed. When the cap screw 34 is turned down until the upper extremity of the plunger 27 is below the lower extremity of the shaft receiving passage 24 insertion of the shaft into the latter passage is accommodated. The shaft and wiper arm are preferably disposed in the relation illustrated in Fig. 5 with the notch 30 facing the plunger. As the shaft 15 is inserted into the passage 24 the plunger is engaged by the outer end section of the shaft. The cap screw 34 may then be removed while relying upon the outer end section of the shaft to hold the plunger in its retracted position. Further movement of the wiper arm to the right, as viewed in Fig. 5, will then bring the notch 30 into accurate alignment with the plunger and the latter will be urged upwardly into the notch when the proper relative position of the wiper and its drive shaft is reached.

Removal of the wiper arm from the drive shaft 15 may be conveniently accomplished in the manner illustrated in Fig. 4, by turning the wiper arm through substantially 180 degrees in either direction from its normal position illustrated in Fig. 2. This rotation of the wiper arm relative to the shaft retracts the plunger 27 to the position illustrated in Fig. 4 where it is held by engagement with the periphery of the shaft. The wiper arm may then be removed axially from the end of the shaft.

It will be understood that when the shaft and arm are operatively engaged the force of the spring 28 forces the flat upper face of the plunger 27 against the flat bottom face of the recess or notch 30 and these two flat faces cooperate, under the pressure of the spring 28, to hold the wiper arm in a predetermined angular relation with respect to the shaft 15 so that during operation of the wiper mechanism the shaft 15 and wiper arm oscillate together. The engagement of the plunger 27 with the side faces 31 of the notch 30 maintains the wiper arm against inadvertent axial displacement on the shaft. If the mechanism is operating and consequently the shaft 15 is oscillating, and oscillation of the wiper arm is stopped manually or otherwise, if the force tending to oscillate the shaft 15 is sufficient the relative oscillation between the shaft 15 and wiper arm at such time will cause the cooperating faces of the shaft 15 and plunger 27 to act to force the plunger 27 downwardly in the bore 23, thus allowing the shaft to oscillate while the arm is held stationary or oscillated relative to the shaft 15. The same action occurs, for instance, if the shaft is stationary and the arm is caused by manual pressure to oscillate relative to the shaft, particularly in mechanically driven constructions where the shaft may be so arranged as to be oscillatable only through its power means. Inasmuch as the spring 28 is designed to maintain the shaft 15 and wiper arm against relative oscillation when normal resistance is met by the wiper blade, the blade will oscillate as in conventional constructions during normal operation, but the connection between the arm and shaft will yield under abnormal conditions to prevent damage to the rest of the wiper mechanism.

In the form of the invention illustrated in Figs. 6 to 9, inclusive, the wiper arm includes a stem 33' which is attached to a bifurcated end 34' of a tubular end portion 35 having an axially extending cylindrical bore 36 in which a plunger 37 is slidably mounted. The plunger is normally urged outwardly by a spring 38 bearing between the latter and the inner extremity of the bore 36. Formed in the upper end of the tubular end portion 35 is a transverse passage 39 having an open right extremity, as viewed in Fig. 6 and a closed left extremity 40 formed by a hollow boss which extends outwardly from an edge of the wiper arm. The upper end of the axial bore 36 is closed by a plug 41 having a substantial semi-cylindrical recess 42 in its inner extremity which conforms to the curvature of the shaft 43 upon which the wiper arm is mounted. The shaft 43 is substantially identical to the shaft 15 shown in Figs. 2 to 5, inclusive, but in addition it is provided with an axially extending projection 44 of semi-circular shape which is formed by cutting away a part of the extremity of the shaft. The projection 44 is aligned axially with a notch 45 formed in the side of the shaft 43. This notch receives the outer end of the plunger 37, thereby detachably holding the wiper arm and its shaft in assembled relation and establishing a releasable driving connection therebetween.

The wiper arm illustrated in Fig. 6 may be removed from its shaft 43 by rotating it substantially 180 degrees from the position shown and then moving the arm to the left as viewed in Fig. 6, the operation being substantially identical to that described in connection with Fig. 4. When a wiper arm embodying this form of the invention is removed from its driving shaft, the plunger 37 is projected outwardly by the spring 38 until its outer extremity abuts the side portions 43' of the recess 42 in the plug 41. With the plunger in this position, the arm may be mounted on the shaft 43 by turning it to a position substantially 180 degrees from its position illustrated in Fig. 6 and then engaging the projection 44 between the outer extremity of the plunger 37 and the plug 41. When the projection 44 is so disposed, the end portion of the shaft 43 adjacent thereto extends into the entrance to the passage 39 and upon rotation of the arm to its normal position, the projection 44 cams the plunger 37 inwardly sufficiently to permit complete insertion of the shaft 43 into the passage 39. The notch 45 of the shaft 43 registers with the plunger 37 the spring 38 urges the latter outwardly into the notch to establish a releasable driving connection between the wiper arm and its shaft and to detachably secure the same in assembled relation.

In the form of the invention illustrated in Figs. 10 and 11 the wiper arm includes a stem 46' and tubular end portion 47 which preferably comprises a die casting. This tubular end portion has an axially extending cylindrical bore 48 in which a plunger 49 is slidably mounted. The plunger 49 is yieldably urged outwardly by a spring 50 bearing between the plunger and the inner extremity of the axial bore 48. During the manufacture of the tubular end portion 47, a transversely extending passage 51 is provided therein between spaced prongs 52, as illustrated in Fig. 11. In a subsequent operation of the manufacture of the tubular end portion 47, the prongs 52 are bent inwardly by a suitable die forming operation to provide the passage 51 with a substantially cylindrical shape into which the driving shaft of windshield wiping apparatus may be inserted. The prongs 52, however, are spaced apart sufficiently in the finished product to provide a slot 53 through which a screw driver, or any suitable tool, may be inserted for the purpose of holding the plunger 49 in a retracted position in order to accommodate insertion of the shaft into the passage 51.

In Figs. 12, 13, and 14 is illustrated another form of the invention in which the windshield wiper arm includes separable stem and socket portions 54 and 55, respectively. The stem 54 is provided with spaced bayonet joint slots 56 for receiving pins 57 which extend through the bifurcated end of the socket portions 55. The upper end portion of the stem 54 is normally disposed between the prongs of the bifurcated end portion of the socket 55, as illustrated in Fig. 12 and it is urged downwardly to retain the pins in the longitudinally extending sections of the bayonet slots 56 by a plunger 58 slidably mounted in an axially extending cylindrical bore 59 formed in the socket portion 55. The plunger 58 is yieldably urged against the upper extremity of the stem 54 by a coil spring 60 which bears between the plunger 58 and a second plunger 61 which is also slidably mounted in the bore 59 of the socket portion. Formed in the upper end portion of the socket portion 55 is a transversely extending passage 62 for receiving a driving shaft 63 of any suitable windshield wiping mechanism. The shaft 63 is preferably identical to the shaft 15 shown in Figs. 2 to 5, inclusive, and it is provided with a notch 64 in which the upper plunger 61 is receivable.

When the stem 54 is removed the plungers 58 and 61 and the spring 60 move downwardly bodily sufficiently to bring the upper extremity of the plunger 61 below the lower portion of the passage 62 so as to accommodate insertion of the shaft 63 into the passage. When the stem 54 is then attached to the socket portion 55 the plungers 58 and 61 and the spring 60 are urged upwardly to serve to bring the plunger 61 into engaged relationship with respect to the notch 64 and the spring 60 is placed under compression. The spring 60 thus serves to releasably hold the plunger 61 in the recess 64 and also serves to releasably hold the stem 54 in assembled relation with respect to the socket portion 55 of the wiper arm.

In all of the foregoing forms of the invention the spring pressed plungers thereof detachably secure the wiper arm to its driving shaft and they also establish a releasable driving connection between the wiper arm and their shaft. In the event that oscillation of the wiper arm is resisted while the windshield wiping apparatus is in operation the shaft oscillates relative to the arm reciprocating the plunger thereof against the action of its outwardly acting spring. The spring by which the plunger of each arm is urged outwardly is preferably so constructed and calibrated that it will yield under resistance to oscillation of the wiper arm of a lower magnitude than that which would result in injury to any of the parts of the driving apparatus.

Although but several forms of the invention has been described and illustrated in detail, it will be apparent to those skilled in the art that various modifications may be made without departing from the scope of the appended claims.

What I claim is:
1. In combination a drive shaft having a notch in one side bounded by spaced shoulders, an arm having a tubular end portion and having a passage therethrough for receiving said shaft, a detent slidably mounted in said tubular end portion and registering with said passage, means for resiliently urging said detent towards said passage, and a releasable member on said tubular end portion for holding said detent in retracted position to accommodate insertion of said shaft into said passage.

2. In combination, a drive shaft having a notch in one side bounded by spaced shoulders, an arm having a tubular end portion and having a passage therethrough for receiving said shaft, a detent slidably mounted in said tubular end portion and registering with said passage, said detent being disposed to partially fill said passage, means for resiliently urging said detent towards said passage, and a projection on said shaft smaller than said shaft and angularly spaced from said notch engageable with said detent for urging the latter to a retracted position during relative rotation of said shaft and arm so as to accommodate insertion of said shaft into said passage.

3. In combination, a drive shaft having a notch therein, an arm having a tubular end portion provided with a transverse passage and having a slot communicating with the interior thereof, a plunger slidably mounted in said tubular end portion, and resilient means for urging said plunger into said notch so as to establish a releasable driving connection between said shaft and said arm and to detachably secure said arm against displacement from said shaft, said detent being retractable by insertion of a suitable tool through said slot and into said tubular end portion for accommodating insertion of said shaft into said passage.

4. In combination, a driving shaft having a projection extending axially from one extremity and an adjacent notch in longitudinal alignment therewith, an arm having a tubular end portion provided with an axially extending bore and a transversely extending communicating passage for receiving said shaft, a plunger slidably mounted in said bore engageable in said notch for establishing a releasable driving connection between said arm and said shaft, a resilient element for urging said plunger into said notch, means for limiting outward movement of said plunger when the shaft is removed from said passage to thereby hold said plunger spaced from the extremity of said end portion, said plunger being retractable for admitting said shaft into said passage by engaging said projection in said passage and then rotating said arm relative to said shaft while said projection is extended between said plunger and the outer extremity of said tubular end portion.

5. In combination, a driving member, an arm including a tubular end portion and a separable stem, coupling means for detachably connecting said stem and tubular end portions including a resilient element for yieldably holding the same in a predetermined assembled relation, and means in said tubular end portion operable by said resilient element for establishing a releasable driving connection between said shaft and arm.

6. In combination, a driving shaft having a notch therein, an arm including a tubular end portion and a separable stem, coupling means including bayonet joint elements on said stem and tubular end portion respectively for detachably connecting them together, a resilient element normally yieldably holding said stem and tubular end portion in assembled relation, and means operable by said resilient element and engageable in the notch of said shaft for establishing a releasable driving connection between the latter and said arm.

7. The combination with a rotatable shaft and an arm detachably secured thereto and disposed to be driven by the rotation thereof, of cooperating members on said shaft and said arm respectively to establish a yielding rotative driving connection between said shaft and arm releasable upon a load transmitted therebetween exceeding a predetermined value, means cooperating with said members when in driving condition to positively prevent detachment of said arm from said shaft, said means being rendered ineffective by said release.

8. The combination with a rotatable shaft and an arm on said shaft and disposed to be driven by the rotation thereof, of a member on said shaft, and a cooperating member on said arm, said first and second members being constructed and arranged to establish a yielding rotative driving connection between said shaft and said arm automatically releasable upon a load transmitted therebetween exceeding a predetermined value, and means cooperating with said members when in driving condition to positively limit movement of said arm axially of said shaft, said means being rendered ineffective by said release.

9. The combination with a rotatable shaft member and an arm member on said shaft and disposed to be driven by rotation thereof, of a recess formed in one of said members, and a detent supported on the other of said members, said recess and said detent forming a yielding rotative driving connection between said members automatically releasable upon a load transmitted between them exceeding a predetermined value, said recess having shoulders cooperating with said detent when in driving condition to positively prevent detachment of one of said members from the other, said shoulders being rendered ineffective by said release.

10. Windshield wiping apparatus comprising in combination, a drive shaft having spaced shoulders thereon, a face between said shoulders, a driven arm having a transverse passage for receiving said shaft, a detent resiliently and shiftably mounted on said arm engageable between said shoulders for detachably holding said arm against displacement from said shaft and for forming a releasable driving connection between said arm and said shaft, said detent being retractable out of engagement with said face by relative rotation between said shaft and arm, said shoulders being so angled to said detent that said detent is not retractable by pressure of said shoulders against said detent.

11. In combination, a drive shaft having a notch in one side bounded by spaced shoulders, an arm having a tubular end portion and having a passage therethrough for receiving said shaft, a detent slidably mounted in said tubular end portion and registering with said passage, means for resiliently urging said detent towards said passage, and a projection on said shaft engageable with said detent for urging the latter to a retracted position to accommodate insertion of said shaft into said passage.

FRANK KRITZ.